(12) United States Patent
Sasaki

(10) Patent No.: US 8,205,484 B2
(45) Date of Patent: Jun. 26, 2012

(54) APPARATUS AND METHOD FOR LEAK TESTING

(75) Inventor: Toru Sasaki, Tokyo (JP)

(73) Assignee: Fukuda Co., Ltd., Tokyo (JP)

( * ) Notice: Subject to any disclaimer, the term of this patent is extended or adjusted under 35 U.S.C. 154(b) by 411 days.

(21) Appl. No.: 12/604,679

(22) Filed: Oct. 23, 2009

(65) Prior Publication Data
US 2010/0206054 A1 Aug. 19, 2010

(30) Foreign Application Priority Data

Feb. 17, 2009 (JP) .............................. 2009-000773 U
Feb. 17, 2009 (JP) ................................. 2009-034017

(51) Int. Cl.
G01M 3/26 (2006.01)
G01M 3/32 (2006.01)

(52) U.S. Cl. .................. 73/46; 73/40; 73/49.7; 73/49.8

(58) Field of Classification Search ............... 73/40–9.8
See application file for complete search history.

(56) References Cited

U.S. PATENT DOCUMENTS

| | | | | |
|---|---|---|---|---|
| 3,987,664 A * | 10/1976 | Hass et al. | ...................... | 73/49.2 |
| 4,501,124 A * | 2/1985 | Shone et al. | ...................... | 62/129 |
| 4,532,795 A * | 8/1985 | Brayman et al. | .................. | 73/40 |
| 4,625,545 A * | 12/1986 | Holm et al. | ....................... | 73/40 |
| 4,686,851 A * | 8/1987 | Holm et al. | ...................... | 73/49.2 |
| 4,813,268 A * | 3/1989 | Helvey | ............................. | 73/40.7 |
| 4,845,977 A * | 7/1989 | Aarts | ................................. | 73/49.3 |
| 4,930,342 A * | 6/1990 | McDaniel | ........................ | 73/49.3 |
| 4,991,426 A * | 2/1991 | Evans | ......................... | 73/40.5 A |
| 5,010,761 A * | 4/1991 | Cohen et al. | .................... | 73/40.7 |
| 5,267,468 A * | 12/1993 | Zoccoletti et al. | ................. | 73/40 |
| 5,406,831 A * | 4/1995 | Kollie et al. | ...................... | 73/49.3 |
| 5,850,036 A * | 12/1998 | Giromini et al. | ................... | 73/40 |
| 6,289,722 B1 * | 9/2001 | Lycan et al. | ...................... | 73/49.2 |
| 6,332,350 B1 * | 12/2001 | Inoue et al. | ........................ | 73/40 |
| 6,354,140 B1 * | 3/2002 | Farkas et al. | ............... | 73/40.5 R |
| 7,040,143 B2 * | 5/2006 | Johnson et al. | ................. | 73/49.3 |
| 7,213,440 B2 * | 5/2007 | Hoffmann et al. | .............. | 73/1.03 |
| 7,641,382 B2 * | 1/2010 | Izawa et al. | ........................ | 374/4 |

FOREIGN PATENT DOCUMENTS

JP 2004061201 A 2/2004
JP 2007064737 A 3/2007

* cited by examiner

*Primary Examiner* — David Rogers
(74) *Attorney, Agent, or Firm* — Stephen B. Salai, Esq.; Thomas B. Ryan, Patent Agent; Harter Secrest & Emery LLP

(57) ABSTRACT

A leak testing apparatus 1 includes a heat sensitive member 70 having a body 71 made of a material having high thermal conductivity. The body 71 is abutted against an outer surface of a workpiece 10 to close an opening of an inner space 11 of the workpiece 10. A pressure chamber 73 is formed inside the body 71 as arranged along the outer surface and as arranged over an area wider than the opening. Pressurized gas is introduced to the pressure chamber 73. Data on pressure change in the inner space 11 of the workpiece 10 is compensated based on inner pressure information regarding the pressure chamber 73, and leak judgment is made.

10 Claims, 7 Drawing Sheets

APPARATUS AND METHOD FOR LEAK TESTING

TECHNICAL FIELD

This invention relates to an apparatus and a method for leak testing by introducing pressurized gas into an inner space of a workpiece and measuring pressure change in the inner space.

BACKGROUND ART

In general, in a differential pressure type leak test, pressurized gas such as compressed air is introduced to an inner space of a workpiece and a reference space. Then the inner space and the reference space are blocked from each other, each forming a closed system. If there is leak in the workpiece, the leak is detected as a differential pressure. In this way, a pass/fail judgment can be made on the workpiece.

When the pressurized gas is introduced into the inner space of the workpiece, the temperature of the inner space is increased due to adiabatic compression. Then, the heat is released with time, and the temperature is decreased. If there is temperature difference between the workpiece and facilities surrounding the workpiece or ambient air due to heating or cooling of the workpiece, or if there is temperature difference between the pressurized gas and the workpiece, the temperature inside the workpiece changes with time. Such a temperature change also causes a pressure change.

To address this issue, in a method for leak testing disclosed in Japanese Published Patent Application No. 2007-064737 (referred to as "Patent Document 1" hereinafter), temperature change, as well as pressure change, in an inner space of a workpiece is measured, and compensation is made in which a component of the pressure change attributable to the temperature change is subtracted from the pressure change. As a result, accuracy in leak judgment and consequently in pass/fail judgment on workpiece can be increased.

To be more specific, a heat sensitive member having high thermal conductivity, for example, is prepared. A sealed pressure chamber (heat sensitive chamber) is formed inside the heat sensitive member. The heat sensitive member is disposed in the inner space of the workpiece. Pressurized gas is introduced into the pressure chamber of the heat sensitive member. Furthermore, the pressurized gas is introduced into the inner space of the workpiece (space between an inner wall of the inner space of the workpiece and the heat sensitive member, to be more exact). Then the pressure change in the pressure chamber as well as the pressure change in the inner space of the workpiece is measured. The pressure change in the pressure chamber is mainly attributable to temperature change in the inner space of the workpiece. Therefore, based on the measured data on the pressure change in the pressure chamber, compensation can be made to the measured data on the pressure change in the inner space of the workpiece, and a component of the pressure change attributable to the temperature change can be subtracted from the pressure change. Leak judgment is made based on the compensated data.

DISCLOSURE OF THE INVENTION

Problem to be Solved by the Invention

The heat sensitive member is required to have a certain amount of size because the heat sensitive member has the pressure chamber inside. When the inner space of the workpiece is narrow, it is difficult to receive the heat sensitive member in the inner space.

Means for Solving the Problem

The present invention has been achieved to solve the above mentioned problem. In a first means to solve the problem, a heat sensitive member is placed outside of a workpiece instead of inside thereof. Therefore, no problem arises even when an inner space of the workpiece is narrow. In this arrangement, a size of the heat sensitive member and consequently a size of a pressure chamber inside the heat sensitive member can be set to any size without being limited by a size and shape of the inner space of the workpiece. The pressure chamber can be arranged along an outer side surface of the heat sensitive member or along an outer surface of the workpiece, and the pressure chamber can be arranged along over an area wider than an opening of the inner space of the workpiece. Preferably, the outer side surface of the heat sensitive member is formed to fit the outer surface of the workpiece. The outer side surface of the heat sensitive member is abutted against the outer surface of the workpiece to close the opening of the inner space of the workpiece to the outer surface. No another closure member is necessary to close the opening, contributing to the reduction of the number of parts. Pressurized gas is introduced to the inner space and an inner pressure of the inner space is detected by a first pressure sensor. Preferably, the first pressure sensor is a differential pressure sensor that detects difference between a reference pressure and the inner pressure of the inner space. At the same time, pressurized gas is introduced to a pressure chamber inside the heat sensitive member and an inner pressure of the pressure chamber is detected by a second pressure sensor. Preferably, the second pressure sensor is a differential pressure sensor that detects difference between a reference pressure and the inner pressure of the pressure chamber. Based on inner pressure information regarding the pressure chamber, the inner pressure information regarding the inner space is compensated by subtracting a component of the inner pressure information attributable to temperature change in the inner space therefrom. Leak from the inner space is judged based on the compensated inner pressure information regarding the inner space.

When the temperature of the inner space of the workpiece changes, transfer of heat to the heat sensitive member causes the inner pressure of the pressure chamber to change as well. This means the temperature change in the inner space of the workpiece can be indirectly measured by measuring the inner pressure of the pressure chamber. By subtracting a component attributable to temperature change from the pressure change in the inner space of the workpiece, accuracy of leak judgment (pass/fail judgment on the workpiece) can be increased.

Preferably, the pressure chamber is formed along the outer surface of the workpiece over an area wider than the opening. By this arrangement, the temperature change in the workpiece can be surely detected.

Preferably, the heat sensitive member has a body made of a material having high thermal conductivity and a seal member provided around a portion of the body that covers the opening. By this arrangement, the inner space of the workpiece can be more securely sealed.

In a case where a plurality of inner spaces are formed in the workpiece, it is preferable that the body straddles the plurality of inner spaces to close openings of the inner spaces. Furthermore, it is preferable that the heat sensitive member includes a plurality of seal members each corresponding to the openings of the inner spaces.

The openings of the plurality of the inner spaces of the workpiece can be closed by a single heat sensitive member. By providing the seal members corresponding to the inner spaces, the openings of the inner spaces can be securely sealed.

Preferably, an introduction pressure of the pressurized gas to the pressure chamber is higher than an introduction pressure of the pressurized gas to the inner space. By this arrangement, the inner pressure of the pressure chamber can be made to vary more greatly in response to the temperature change, and a small temperature change can be surely detected.

Preferably, temperature of a portion of the outer surface of the workpiece other than a portion to be abutted against the heat sensitive member is measured by a second temperature measuring device. Alternatively, the temperature of the heat sensitive member may be measured by the second temperature measuring device. By this arrangement, when temperature information obtained by the second temperature measuring device is more highly correlated to the inner pressure information regarding the inner space than the inner pressure information regarding the pressure chamber, compensation can be made based on the temperature information instead of the inner pressure information regarding the pressure chamber.

The second temperature measuring device may be a resistance thermometer made of a material whose electrical resistance changes according to temperature, or a thermocouple in which electromotive force corresponding to temperature is generated between two kinds of metals, or a liquid column thermometer in which heat sensitive liquid, such as mercury, whose volume changes according to temperature is used, or a bimetal thermometer in which two metals plates having different coefficients of thermal expansion are bonded together. The second temperature measuring device is not limited to the temperature measuring device of a type to be contacted against the outer surface of the workpiece, but may be of a type to detect temperature without contacting an object. For example, the second temperature measuring device may be an infrared radiation thermometer that detects intensity of infrared rays emitted from a surface of the workpiece.

The temperature of the heat sensitive member may be measured by another temperature measuring device.

Preferably, the pressure chamber includes a plurality of hole portions having a linear configuration. Being linear, the hole portions can be easily formed. Provision of the plurality of hole portions enables the heat sensitive member to have a wide temperature sensing zone.

Preferably, the pressure chamber includes a plurality of first hole portions disposed parallel to one another and a second hole portion intersecting the plurality of first hole portions. By this arrangement, the pressure chamber can be formed to widely spread inside the heat sensitive member, thereby surely making the temperature sensing zone of the heat sensitive member wide. Making the plurality of hole portions intersect one another directly or indirectly allows the pressurized gas to run through all the hole portions if the pressurized gas is introduced to any one of the hole portions.

In a second means to solve the above-mentioned problem, instead of the heat sensitive member having the pressure chamber, which is required to have a certain amount of size, a temperature measuring device is disposed in the inner space of the workpiece. An inspection space is formed between an inner peripheral surface of the inner space of the workpiece and an outer peripheral surface of the temperature measuring device received in the inner space. The temperature measuring device measures physical quantities, other than pressure, that are directly responsive to the temperature of the inspection space. Examples of the physical quantities include electric current, voltage, electrical resistance, displacement of bimetal and volume expansion of mercury. The temperature measuring device can be made compact because the temperature measuring device does not have a pressure chamber. Accordingly, the temperature measuring device can be easily received in the inner space of the workpiece even when the inner space is narrow.

Pressurized gas is introduced to the inspection space and inner pressure of the inspection space is detected by a pressure sensor. Preferably, the pressure sensor is a differential pressure sensor that detects difference between a reference pressure and the inner pressure of the inspection space. Based on information on the physical quantity obtained by the temperature measuring device, inner pressure information regarding the inspection space is compensated by subtracting a component attributable to temperature change in the inspection space therefrom. Leak from the inspection space is judged based on the compensated inner pressure information regarding the inspection space.

Preferably, the temperature measuring device is a resistance thermometer including a temperature measuring circuit having a resistance whose electrical resistance value changes according to the temperature. The change in the electrical resistance value according to the temperature causes electric current or voltage of the temperature measuring circuit to change. By reading the electric current and the resistance as physical quantities related to the temperature, the pressure data can be compensated for temperature.

Although it is preferred that the temperature measuring device is the resistance thermometer, the temperature measuring device is not limited to the resistance thermometer. The temperature measuring device may be a thermocouple, a mercury thermometer, a bimetal thermometer or an infrared radiation thermometer. When the temperature measuring device is a thermocouple, the physical quantity is an electromotive force of the thermocouple. When the temperature measuring device is a mercury thermometer, the physical quantity is a height of a mercury column. When the temperature measuring device is a bimetal thermometer, the physical quantity is displacement of the bimetal. When the temperature measuring device is an infrared radiation thermometer, the physical quantity is intensity of infrared rays emitted from an object of measurement.

Preferably, a fin is disposed in an outer periphery of the temperature measuring device. The fin enables heat in the inspection space to be surely caught and transferred to a body of the temperature measuring device, thereby enabling the temperature of the inspection space to be surely measured. Since the fin possesses a certain width, heat can be caught not from a limited location in the inspection space but from a wide area in the inspection space. Therefore, even if there is a temperature distribution in the inspection space, an average temperature can be measured.

Preferably, the fin has a circular configuration surrounding the measuring device body. By this arrangement, the heat can be caught from an entire periphery of the measuring device body.

Preferably, a plurality of fins are disposed in an outer periphery of the measuring device body, the fins arranged spacedly in a longitudinal direction of the measuring device body. In this arrangement, the fins are arranged in a distributed manner in the longitudinal direction of the measuring device body. This enables the heat to be caught from a wide area of the inner space, thereby enabling the average temperature of the inner space to be more surely measured.

BEST MODE FOR CARRYING OUT THE INVENTION

Embodiments of the present invention will now be described with reference to accompanying drawings.

Figure 1:
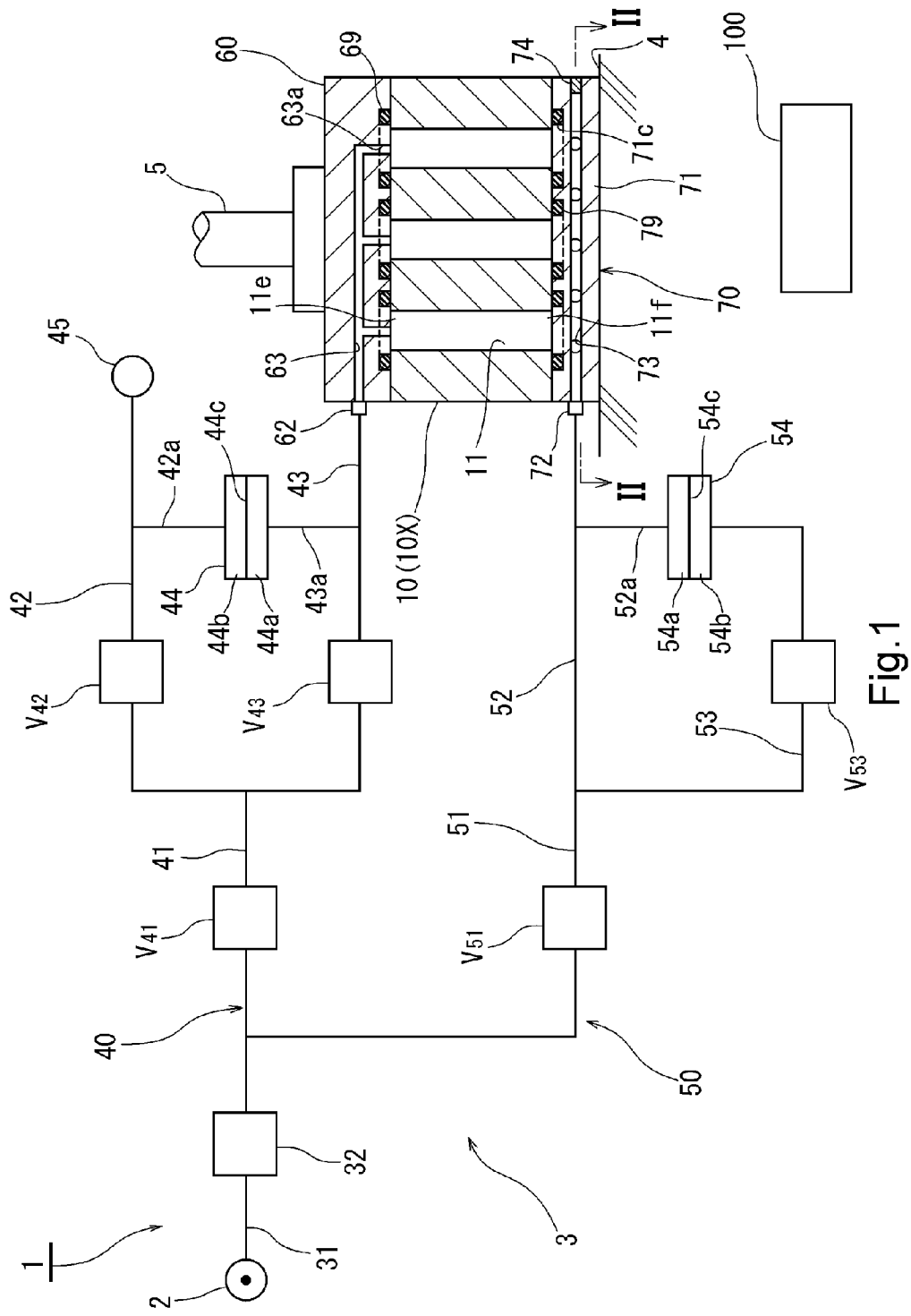
FIG. 1 is a circuit diagram of a leak testing apparatus according to a first embodiment of the present invention, showing a schematic structure of the apparatus.

FIG. 1 schematically illustrates a circuit configuration of a leak testing apparatus 1 according to a first embodiment of the present invention. A test object of the leak testing apparatus 1 is a workpiece 10. An example of the workpiece 10 is a cylinder block of an automotive engine. A plurality of inner spaces 11 are formed inside the workpiece 10. In this embodiment, all of the inner spaces 11 are open to an upper outer surface and a lower outer surface of the workpiece 10.

As shown in FIG. 1, the leak testing apparatus 1 has a pressurized gas source 2 and a pressurized gas passage 3. The pressurized gas source 2 is an air compressor. The pressurized gas source 2 can produce an air pressure in the order of some hundreds of kPa.

The pressurized gas passage 3 is constructed as follows:

A common passage 31 of the pressurized gas passage 3 extends from the pressurized gas source 2. A regulator 32 is provided in the common passage 31. The regulator 32 controls pressure in a portion of the common passage 31 located downstream of the regulator 32. A first introduction passage 40 and a second introduction passage 50 are branched from a downstream end of the common passage 31.

The first introduction passage 40 has a trunk passage 41 and two branch passages 42, 43. The trunk passage 41 continues from the common passage 31. The two branch passages 42, 43 branch from the trunk passage 41. An air tank 45 is connected to a downstream end of the branch passage 42. A downstream end of the branch passage 43 extends to a vicinity of a workpiece 10.

Opening/closing valves $V_{41}$, $V_{42}$, $V_{43}$ are respectively disposed in the passages 41, 42, 43. The reference numerals of the passages 41, 42, 43 in which the valves are disposed are respectively added as additional characters to the reference numeral V for the valves (same is applicable to valves $V_{51}$, $V_{53}$ to be described later). A first pressure sensor 44 is disposed between the branch passages 42, 43 that are located downstream of the opening/closing valves $V_{42}$, $V_{43}$. The first pressure sensor 44 is a differential pressure including a diaphragm 44c and first and second chambers 44a, 44b divided by the diaphragm 44c. The first chamber 44a is connected to the branch passage 42 via a sensor connecting passage 42a. The second chamber 44b is connected to the branch passage 43 via a sensor connecting passage 43a. The diaphragm 44c is displaced according to differential pressure between the first chamber 44a and the second chamber 44b. Electrical signals according to the displacement of the diaphragm 44c are output from the differential pressure sensor 44.

The second introduction passage 50 has a trunk passage 51 and two branch passages 52, 53. The trunk passage 51 communicates with the common passage 31. The two branch passages 52, 53 branch from the trunk passage 51. A downstream end of the branch passage 52 extends to a vicinity of the workpiece 10.

Opening/closing valves $V_{51}$, $V_{53}$ are respectively disposed in the trunk passage 51 and the branch passage 53. A second pressure sensor 54 is disposed between the branch passages 52, 53. The second pressure sensor 54 is a differential pressure sensor including a diaphragm 54c and first and second chambers 54a, 54b divided by the diaphragm 54c The first chamber 54a is connected to the branch passage 52 located downstream of the opening/closing valve $V_{51}$ via a sensor connecting passage 52a. The second chamber 54b is connected to a downstream end of the branch passage 53. The diaphragm 54c is displaced according to differential pressure between the first chamber 54a and the second chamber 54b. Electrical signals according to the displacement of the diaphragm 54c are output from the differential pressure sensor 54.

The leak testing apparatus 1 further includes a pressure introduction passage forming member 60 and a heat sensitive member 70. The pressure introduction passage forming member 60 and the heat sensitive member 70 are opposed to each other in a vertical direction. The workpiece 10 is placed between the pressure introduction passage forming member 60 and the heat sensitive member 70. The pressure introduction passage forming member 60 has a plate-like configuration having an area corresponding to an upper surface of the workpiece 10. The pressure introduction passage forming member 60 covers the upper surface of the workpiece 10. Upper end openings 11e of the plurality of inner spaces 11 are closed by the pressure introduction passage forming member 60. A lower surface (surface abutted against the workpiece 10) of the pressure introduction passage forming member 60 is provided with a plurality of O-rings 69 (seal members). The O-rings 69 correspond to the inner spaces 11 in a one-to-one manner. Gaps between portions around the openings 11e of the inner spaces 11 of the workpiece 10 and the pressure introduction passage forming member 60 are sealed by the corresponding O-rings 69.

A port 62 is disposed in one side portion of the pressure introduction passage forming member 60. A downstream end of the branch passage 43 is connected to the port 62. A pressure introduction passage 63 is formed inside the pressure introduction passage forming member 60. The pressure introduction passage 63 extends from the port 62 and branches into a plurality of distribution passages 63a. The distribution passages 63a reach the lower surface of the pressure introduction passage forming member 60. The distribution passages 63a correspond to the inner spaces 11 in a one-to-one manner. The distribution passages 63a continue to upper end portions of the corresponding inner spaces 11.

Figure 2:
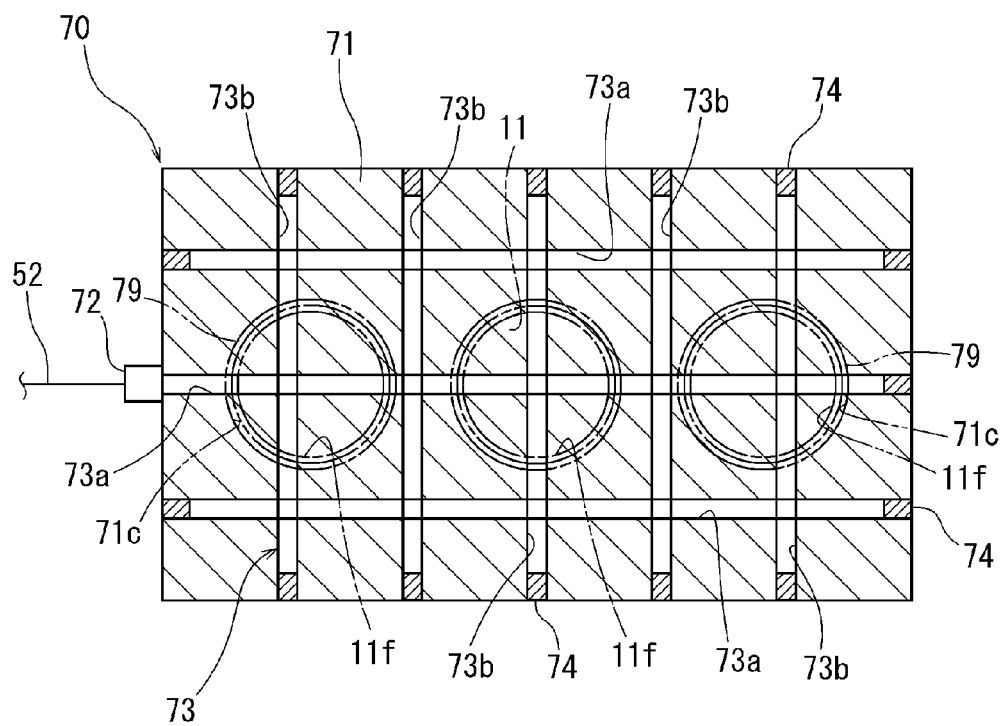
FIG. 2 is a plane sectional view taken along line II-II of FIG. 1, showing a heat sensitive member of the leak testing apparatus.

The heat sensitive member 70 includes a body 71 and a plurality of O-rings 79 (seal members). The body 71 is made of a material having high thermal conductivity such as aluminum. The body 71 has a plate-like configuration having an area corresponding to an under surface of the workpiece 10. The body 71 is disposed at the outside of the workpiece 10. The body 71 covers the under surface of the workpiece 10. Lower end openings 11f of the plurality of inner spaces 11 are closed by the body 71. A plurality of annular grooves 71c are formed in an upper surface (surface abutted against the workpiece 10) of the body 71. Each of the annular grooves 71c receives an O-ring 79. As shown in FIG. 2 with phantom lines, the O-rings 79 correspond to the inner spaces 11 in a one-to-one manner. Gaps between portions around the openings 11f at the lower ends of the inner spaces 11 of the workpiece 10 and the heat sensitive member 70 are sealed by the corresponding O-rings 79.

As shown in FIG. 1, the heat sensitive member 70 is placed on a base 4. A pressing means 5 which, for example, is a hydraulic actuator abuts the pressure introduction passage forming member 60 from above. Pressing downward of the pressure introduction passage forming member 60 by the pressing means 5 causes the pressure introduction passage forming member 60 and the heat sensitive member 70 to be strongly pressed against the workpiece 10, thereby causing the O-rings 69, 79 to be compressed. As a result, the upper and lower end openings 11e, 11f of the inner spaces 11 are securely sealed.

A pressure chamber 73 (heat sensitive chamber) is formed inside the body 71 of the heat sensitive member 70. The pressure chamber 73 is disposed at the outside of the workpiece 10 as well as the body 71. As shown in FIG. 2, the pressure chamber 73 is composed of a plurality of first hole portions 73a and a plurality of second hole portions 73b. Each of the first hole portions 73a extends in a straight line in a longitudinal direction (left-right direction in FIG. 2), for example, of the body 71 of the heat sensitive member 70. The plurality of first hole portions 73a are spacedly arranged in a width direction (top-bottom direction in FIG. 2) of the body 71 parallel to one another. Each of the second hole portions 73b extends in a straight line in the width direction, for example, of the body 71. The plurality of second hole portions 73a are spacedly arranged in the longitudinal direction of the body 71 parallel to one another. Each of the second hold portions 73b intersects the plurality of first hole portions 73a. All of the hole portions 73a, 73b communicate with one another. The hole portions 73a, 73b as a whole are arranged in a lattice configuration. The pressure chamber 73 having the lattice configuration runs through the entirety of the body 71. As shown in FIG. 2, the pressure chamber 73 is arranged over an area wider than the openings 11f along the upper outer side surface of the body 71 and the lower outer surface of the workpiece 10. Opposite ends of each of the hole portions 73a, 73b reach end surfaces of the body 71. A port 72 is disposed in one end portion of one of the hole portions 73a. The downstream end of the branch passage 52 is connected to the port 72. End portions of the hole portions 73a, 73b except for the one connected to the port 72 are closed by plugs 74.

Instead of closing one of the opposite end portions of each of the hole portions 73a, 73b with the plugs 74, the hole portions 73a, 73b may be formed such that the ones of the opposite end portions of the hole portions 73a, 73b extend only up to the vicinity of the end surface of the body 71, not reaching the end surface of the body 71.

The number of the second hole portions 73b provided in the body 71 may be only one.

The leak testing apparatus 1 further includes a controller 100 for conducting a leak test in a method to be described later. The controller 100 includes a drive circuit, an input-output portion, a ROM, a RAM and a CPU. The drive circuit drives the opening/closing valves $V_{41}, V_{42}, V_{43}, V_{51}, V_{53}$. The input-output portion includes a signal conversion circuit. Control programs are stored in the ROM. Measured data obtained by the differential pressure sensors 44, 54, etc. are written in the RAM. The CPU conducts control operations including a leak judgment (pass/fail judgment on the workpiece). Detection signal lines (not shown) form the differential pressure sensors 44, 54 are connected to the controller 100. Electrical signals according to the displacement of the diaphragms 44c, 54c are input to the controller 100 via the detection signal lines.

A method for leak testing using the leak testing apparatus 1 having the above described construction will now be described. The leak testing is composed of a correlation obtaining operation and a regular inspection operation, conducted in this order.

[Correlation Obtaining Operation]

In the correlation obtaining operation, correlation between pressure change and temperature change in the inner spaces 11 of the workpiece 10 is determined. The workpiece 10 used in this part constitutes an "object for obtaining correlation". Hereinafter, "X" is added as appropriate to the reference numeral of the workpiece 10 as the object for obtaining correlation in order to distinguish such workpiece 10X from the workpiece 10 to be inspected in the regular inspection operation to be conducted later. The workpiece 10X is of the same type, the same shape, the same structure and the same material as the workpiece 10 to be inspected in the regular inspection operation. It may be known that the workpiece 10X does not leak. It may be unknown whether the workpiece 10X leaks or does not leak. A pseudo workpiece having substantially the same structure as the workpiece 10 may be made and used as the workpiece 10X.

As shown in FIG. 1, the workpiece 10X is placed on the heat sensitive member 70. The pressure introduction passage forming member 60 is placed on the workpiece 10X. The pressure introduction passage forming member 60 is pressed by the pressing means 5. As a result, the inner spaces 11 of the workpiece 10X are sealed.

The opening/closing valves $V_{41}, V_{42}, V_{43}, V_{51}, V_{53}$ are all opened. Compressed air (pressurized gas) in the order of some hundreds of kPa is introduced from the pressurized gas source 2 to the pressurized gas passage 3. A part of the compressed air flows through the trunk passage 41, the branch passage 43, the port 62 and the pressure introduction passage 63, in this order, and is introduced into the inner spaces 11 of the workpiece 10X. Another part of the compressed air is introduced into the air tank 45 via the branch passage 42. Still another part of the compressed air flows through the trunk passage 51, the branch passage 52 and the port 72, in this order, and then is introduced into the pressure chamber 73. Since the plurality of hole portions 73a, 73b constituting the pressure chamber 73 intersect one another directly or indirectly, when the compressed air is introduced to one of the hole portions 73a via the port 72, the compressed air runs through all the hole portions 73a, 73b and the entirety of the compressed chamber 73 is filled with the compressed air.

Next, the opening/closing valves $V_{41}, V_{51}$ are closed. Then the opening/closing valves $V_{42}, V_{43}$ are closed. Therefore, the inner spaces 11 of the workpiece 10X and the first chamber 44a of the differential pressure sensor 44 communicating with the inner spaces 11 form an independent closed system, and the air tank 45 and the second chamber 44b of the differential pressure sensor 44 communicating with the air tank 45 form another independent closed system. These independent systems are blocked from each other. As a result, differential pressure of the inner spaces 11 (inner pressure information regarding the inner spaces 11), with pressure in the air tank 45 as reference, can be measured by the differential pressure sensor 44.

The opening/closing valve $V_{53}$ is also closed. Therefore, the pressure chamber 73 and the first chamber 54a of the differential pressure sensor 54 communicating with the pressure chamber 73 form an independent closed system and the second chamber 54b of the differential pressure sensor 54 form another independent system. As a result, differential pressure of the pressure chamber 73 (inner pressure information regarding the pressure chamber 73), with pressure in the second chamber 54b as reference, can be measured by the differential pressure sensor 54.

At a time (time t=t0) when a predetermined balance period of about 2 to 3 seconds has passed following the closure of the opening/closing valves $V_{42}$, $V_{43}$, readings of the differential pressure sensors 44, 54 are reset and differential pressure change after the resetting is measured and recoded for each of the pressure sensors.

The differential pressure change in the inner spaces 11 includes a component attributable to temperature change in the inner spaces 11 caused by temperature difference between the inner spaces 11 and the surroundings etc., a component attributable to temperature change in the inner spaces 11 caused by heat radiation after adiabatic compression, and a component attributable to air leak from the inner spaces 11, etc.

The temperature change in the inner spaces 11 is transmitted through the heat sensitive member body 71 having high thermal conductivity to the pressure chamber 73. As a result, differential pressure change occurs in the pressure chamber 73 as well. Data on the differential pressure change (inner pressure information regarding the pressure chamber 73) is obtained by the differential pressure sensor 54.

After that, various conditions such as introduction pressure from the pressurized gas source 2, initial temperature of the workpiece 10X, initial temperature of the pressure introduction passage forming member 60, initial temperature of the heat sensitive member 70 and ambient temperature are changed, and data on the differential pressure change in the inner spaces 11 of the workpiece 10X and data on the differential pressure change in the pressure chamber 73 are obtained. Preferably, the same workpiece 10X is used throughout the changes made to the conditions.

For each of the conditions in which the data are obtained, a differential pressure versus time curve of the inner spaces 11 (inner pressure information regarding the inner spaces 11) and a differential pressure versus time curve of the pressure chamber 73 (inner pressure information regarding the pressure chamber 73) are compared to determine correlation between them.

For example, a differential pressure value x, which is a differential pressure value at a time when a certain time t1 has passed since the time t0, is picked up on the differential pressure versus time curve of the inner spaces 11. Also, a differential pressure value y, which is a differential pressure value at the same time t1 is picked up on the differential pressure versus time curve of the pressure chamber 73. It is preferable that time t1 be set within a range in which the two differential pressure curves behave similarly. Setting of the time t1 can be changed arbitrarily. A graph is made in which a horizontal axis x represents the differential pressure value of the pressure chamber 73 at time t1 and a vertical axis y represents the differential pressure value of the inner spaces 11 at time t1 (see FIG. 5 of the above-mentioned Patent Document 1). The pick-up data obtained in the above mentioned conditions are plotted on the graph. For the plotted pick-up data, linear interpolation is performed by the least-square method. This yields a linear expression (1) showing correlation between the differential pressure value x of the pressure chamber 73 and the differential pressure value y of the inner spaces 11:

$$y=ax+b \quad (1)$$

where both a and b are constants.

Instead of the differential pressure values at time t1, a gradient of a line connecting the differential pressure at time t0 and the differential pressure at time t1 may be used as pick-up data. In this case, a correlation equation equivalent to the expression (1) is obtained. Alternatively, differential values of the differential pressures at time t0 may be used as pick-up data to obtain a correlation equation. Alternatively, as shown in Japanese Published Patent Application No. 2004-61201, an approximate expression involving an exponential function may be made and non-linear fitting may be performed to determine a coefficient of the approximate expression.

The correlation equation (1) can be regarded as showing relationship between the temperature change and the differential pressure change in the inner spaces 11. Of the first term and the second term in the right-hand side of the correlation equation (1), only the first term includes the differential pressure value x of the pressure chamber 73. The constant b in the second term is a quantity not related to the differential pressure change in the pressure chamber 73, i.e. the temperature change in the inner spaces 11. In other words, the constant b corresponds to the amount of differential pressure change in the inner spaces 11 with the amount attributable to the temperature change subtracted therefrom. This means that the constant b indicates the component of the differential pressure change attributable to the leak form the inner spaces 11. Therefore, correlation between the temperature change and the component of the differential pressure change attributable only to the temperature change in the inner spaces 11 can be expressed in an expression (2) shown below:

$$y=ax \quad (2)$$

After the correlation obtaining operation is completed, the workpiece 10X is removed from the leak testing apparatus 1.

[Regular Inspection Operation]

After that, the testing proceeds to the regular inspection operation.

Prior to the inspection, a workpiece 10 to be actually inspected is washed with warm wash water of around 40° C., for example. By this, the workpiece 10 is warmed to around 40° C., for example.

Placing Step

The workpiece 10 is placed on the heat sensitive member 70. The pressure introduction passage forming member 60 is placed on the workpiece 10. The pressure introduction passage forming member 60 is pressed with the pressing means 5. This seals the inner spaces 11 of the workpiece 10.

Heat of the warmed workpiece 10 is transferred to the heat sensitive member 70, and the temperature of the heat sensitive member 70 is raised. The temperature of the workpiece 10 is decreased.

First Detecting Step and Second Detecting Step

Then detecting steps of generally the same as those in the above-mentioned correlation obtaining operation are performed.

Specifically, compressed air is introduced to the inner spaces 11 and the pressure chamber 73.

Then the opening/closing valves $V_{41}$, $V_{51}$ are closed. After that, the opening/closing valves $V_{42}$, $V_{43}$ are closed. The opening/closing valve $V_{53}$ is also closed. As a result, the inner spaces 11 and the pressure chamber 73 form closed systems which are independent of each other.

At a time t0 when a predetermined balance period (about 2 to 3 seconds) has passed following the closure of the opening/closing valves $V_{42}$, $V_{43}$, the differential pressure sensors 44, 54 are reset and the measurements of the differential pressures of the inner spaces 11 and the pressure chamber 73 are respectively started. A measured differential pressure $D_{11}$ of the inner spaces 11 obtained by the differential pressure sensor 44 at a time when a certain time t1 has passed since the time t0 (inner pressure information regarding the inner spaces 11) and a measured differential pressure $D_{73}$ of the pressure chamber 73 obtained by the differential pressure sensor 54 at the time t1 (inner pressure information regarding the pressure chamber 73) are picked up.

Compensating Step

After that, the measured differential pressure $D_{11}$ of the inner spaces 11 is compensated based on the measured differential pressure $D_{73}$ of the pressure chamber 73 and on the correlation equation (2) obtained in the determination of compensation part mentioned above. Specifically, the differential pressure value $D_{73}$ of the pressure chamber 73 is substituted for the variable X in the right-hand side of the equation (2) to obtain an amount of differential pressure change $y=aD_{73}$ attributable to temperature of the inner spaces 11. The amount of differential pressure change $aD_{73}$ is subtracted from the actually measured differential pressure $D_{11}$. In other words, the following operation is performed:

$$D_{LEAK}=D_{11}-aD_{73} \qquad (3)$$

By this operation, amount of differential pressure change attributable only to the leak from the inner spaces 11 $D_{LEAK}$ is obtained.

The compensation mentioned above is made by the controller 100. The controller 100 at this time constitutes a compensator.

Judging Step

Pass/fail judgment is made on the workpiece 10 based on the amount of differential pressure change $D_{LEAK}$. Specifically, if the amount of differential pressure change $D_{LEAK}$ does not exceed an allowable maximum, the workpiece 10 is judged to be good. If the amount of differential pressure change $D_{LEAK}$ exceeds the allowable maximum, the workpiece 10 is judged to be defective.

The judgment mentioned above is performed by the controller 100. The controller 100 at this time constitutes a judgment means.

According to this method for judgment, accuracy of judgment can be increased since the amount of differential pressure change attributable to the change in temperature is excluded.

Moreover, since the temperature change in the inner spaces 11 is measured by conversion from pressure, even a slight temperature change can be surely detected. For example, when an initial pressure is 500 kPa and an initial temperature is 25° C., the temperature change by +0.1° C. is equivalent to an amount of the pressure change of 167.8 Pa according to the Boyle-Charles law. This means that when the pressure in the pressure chamber 73 is in a similar order of magnitude to the test pressure introduced to the inner spaces 11, a great pressure change can be obtained for a slight temperature change. This enables a very high-sensitivity temperature measurement. Moreover, since the amount of pressure change is measured as the differential pressure by the differential pressure sensor 54, measurement sensitivity can be further enhanced.

It is not necessary to place the heat sensitive member 70 in the inner spaces 11 of the workpiece 10. Therefore, the size of the heat sensitive member 70, and consequently the size of the pressure chamber 73, can be set without being limited by size and shape of the inner spaces 11 of the workpiece 10, and the temperature change can be surely detected. Even when the inner spaces 11 are narrow, it can easily be coped with.

Placing the heat sensitive member 70 in contact with an outer surface of the workpiece 10 makes it possible to bring the temperature of the heat sensitive member 70 close to the temperature of the workpiece 10. Consequently, the temperature change in the inner spaces 11 can be surely measured.

Moreover, the heat sensitive member 70 can receive heat from an entirety of a lower outer surface of the workpiece 10. As a result, the temperature of an entirety of the inner spaces 11 can be measured evenly. Therefore, even when there is a temperature distribution in the inner spaces 11, reliability can be secured. Since the pressure chamber 73 is formed along the lower outer surface of the workpiece 10 covering a wider area than the openings 11f, the temperature change in the workpiece 10, and moreover, of the inner spaces 11, can be surely detected.

The openings 11f in the lower side of the inner spaces 11 can be closed by the heat sensitive member 70. This eliminates the necessity of providing an additional closure member, thus reducing the number of components. The plurality of openings 11f of the workpiece 10 can be closed by the single heat sensitive member 70. The openings of the inner spaces 11 can be securely sealed by providing the seal members 79 corresponding to the inner spaces 11.

Since the hole portions 73a, 73b constituting the pressure chamber 73 are formed in a shape of a straight line, they can be easily formed. Since the plurality of hole portions 73a are arranged in the lattice configuration running through the almost entirety of the heat sensitive member 70, the heat sensitive member 70 can have a wider temperature sensing area. Moreover, rigidity of the heat sensitive member 70 can be secured, and therefore, the heat sensitive member 70 can easily withhold pressure applied to seal the inner spaces 11.

Now, another embodiment of the present invention will be described. In the embodiment described below, the same components as those in the embodiments described above are denoted by the same reference numerals, and their description will be omitted.

The workpiece 10 can take various shapes. The pressure introduction passage forming member 60 and the heat sensitive member 70 are formed according to the shape of the workpiece 10.

Figure 3:
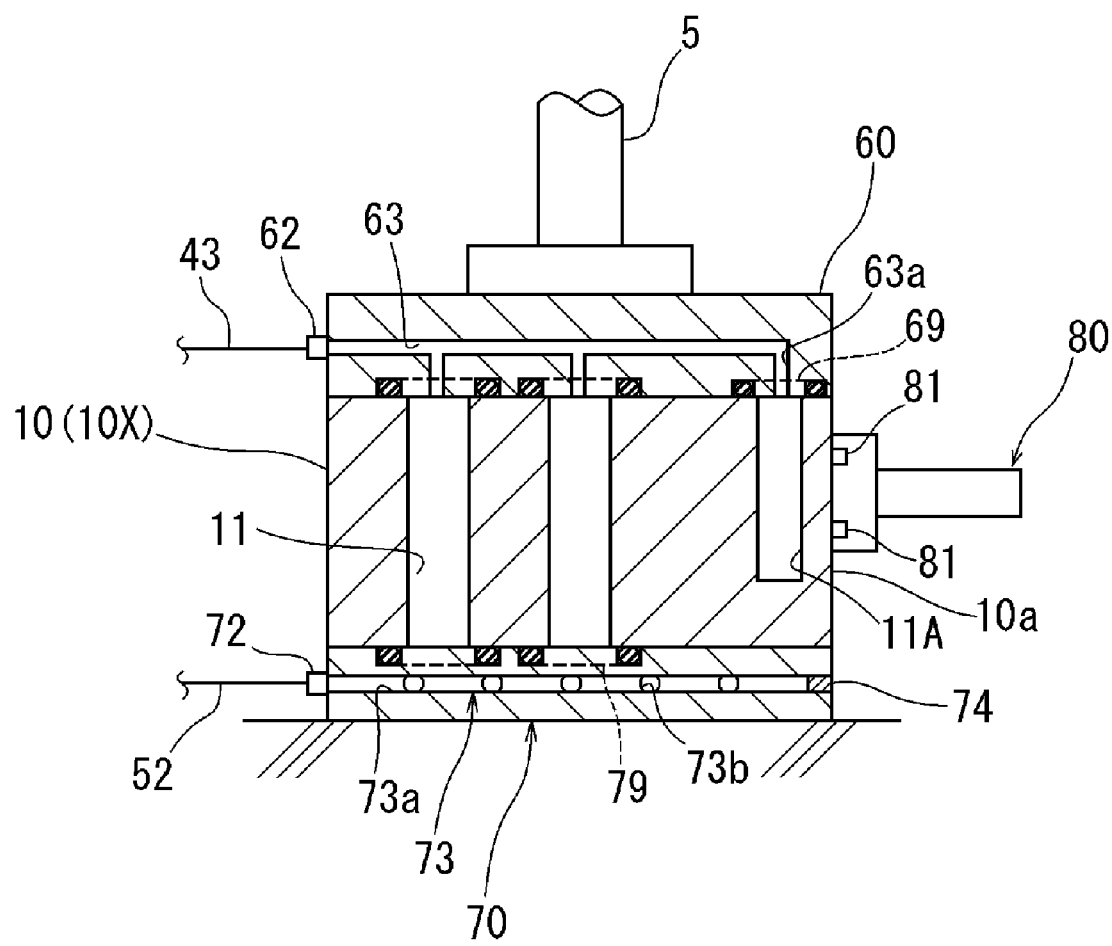
FIG. 3 is a front sectional view showing a second embodiment of the present invention.

For example, in a second embodiment shown in FIG. 3, an inner space 11A of the plurality of inner spaces 11 extends from an upper surface of the workpiece 10 but doesn't reach a lower surface of the workpiece 10. A lower end portion of the inner space 11A is distanced from the heat sensitive member 70. Therefore, it takes time for temperature change inside the inner space 11A to be transmitted to the heat sensitive member 70. On the other hand, the inner space 11A is located near one side surface 10a (surface in the right side in FIG. 3) of the workpiece 10.

Now, a temperature measuring device 80 is placed on the side surface 10a of the workpiece 10. The temperature measuring device 80 assists the heat sensitive member 70 in detecting temperature. The temperature measuring device 80 is a resistance thermometer. Although not shown in detail, a temperature measuring circuit is integrated in the temperature measuring device 80. The temperature measuring circuit has two (a plurality of) temperature sensing portions 81. The temperature sensing portions 81 are disposed in a disc-shaped distal end portion of the temperature measuring device 80, spaced from each other. The temperature sensing portions 81 contact an object to be temperature measured (side surface of the workpiece 10). The temperature sensing portions 81 are resistors made of platinum, for example. Electrical resistance values of the resistors change according to the temperature. Consequently, electric current or voltage of the temperature measuring circuit changes according to the temperature. Temperature of the object can be measured by reading the electric current or the voltage values. The two (a plurality of) temperature sensing portions 81 may be connected in series with each other or in parallel to each other.

In a correlation obtaining operation in the second embodiment, the correlation between the inner pressure information regarding the inner spaces 11 of the workpiece obtained by the differential pressure sensor 44 and the inner pressure information regarding the pressure chamber 73 obtained by the differential pressure sensor 54 is obtained. In addition, correlation between the inner pressure information regarding the inner spaces 11 obtained by the differential pressure sensor 44 and the temperature information regarding the workpiece 10X obtained by the temperature measuring device 80 is also obtained. Specifically, two graphs are produced, for example. One is a first graph in which, as with the first embodiment, differential pressure values (horizontal axis x) of the pressure chamber 73 and differential pressure values (vertical axis y) of the inner spaces 11 at time t1 are plotted. The first graph shows data on correlation between the differential pressure information regarding the inner spaces 11 of the workpiece 10 and the differential pressure information regarding the pressure chamber 73. The other is a second graph in which measured temperature (horizontal axis x) measured by the temperature measuring device 80 and the differential pressure values (vertical axis y) of the inner spaces 11 at time t1 are plotted. The second graph shows data on correlation between the inner pressure information regarding the inner spaces 11 of the workpiece 10 and the temperature information regarding the workpiece 10. One of the first graph and the second graph is selected. The selected graph more clearly shows the correlation between the horizontal axis and the vertical axis. Accordingly, it is easier to obtain the approximate expression (1) from the selected graph.

In a regular inspection operation in the second embodiment, a leak judgment is made based on the selected graph mentioned above. If the selected graph is the first graph, as with the first embodiment, the differential pressure value $D_{11}$ of the inner spaces 11 at time t1 and the differential pressure value $D_{73}$ of the pressure chamber 73 at time t1 are picked up and substituted into the compensation equation (3), and based on the compensated amount of differential pressure $D_{LEAK}$, a pass/fail judgment is made on the workpiece 10.

On the other hand, if the selected graph is the second graph, the differential pressure value $D_{11}$ of the inner spaces 11 at time t1 and the measured temperature $T_{80}$ measured by the temperature measuring device 80 at time t1 are picked up and an operation in the following expression (3') is performed:

$$D_{LEAK} = D_{11} - aT_{80} \quad (3')$$

The coefficient "a" in the second term in the right-hand side of the expression (3') is a gradient of an approximate line of the second graph. Then, based on the value $D_{LEAK}$ obtained from the expression (3'), a pass/fail judgment is made on the workpiece 10.

When the temperature measuring device 80 has a higher sensitivity than the heat sensitive member 70, temperature-compensation can be made based on the temperature information obtained by the temperature measuring device 80.

The inner space 11A is located nearer to the temperature measuring device 80 than to the heat sensitive member 70. Therefore, temperature change in the inner space 11A tends to be reflected more by the temperature measuring device 80 than by the heat sensitive member 70. Moreover, average temperature change in the inner space 11A can be detected with the two (a plurality of) temperature sensing portions 81 spaced from each other.

Figure 4:
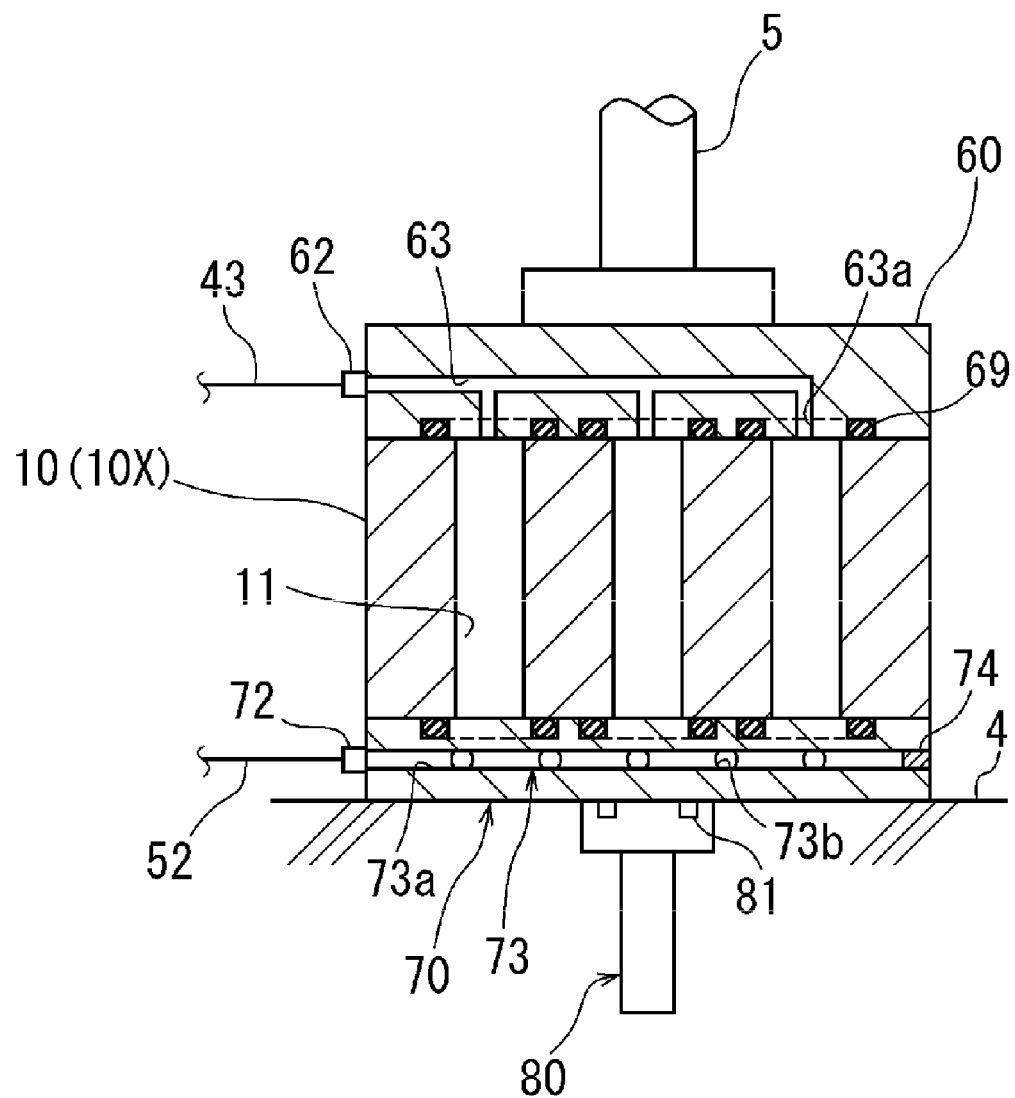
FIG. 4 is a front sectional view showing a modified embodiment of the second embodiment.

FIG. 4 shows a modification of the second embodiment. The temperature measuring device 80 may be in contact with the heat sensitive member 70 instead of the workpiece 10. Temperature of the heat sensitive member 70 is measured by the temperature measuring device 80. When the inner pressure of the inner spaces 11 is correlated more to the measured temperature of the heat sensitive member 70 than to the inner pressure of the pressure chamber 73, the inner pressure of the inner spaces 11 is compensated with temperature based on the measured temperature of the heat sensitive member 70.

Figure 5:
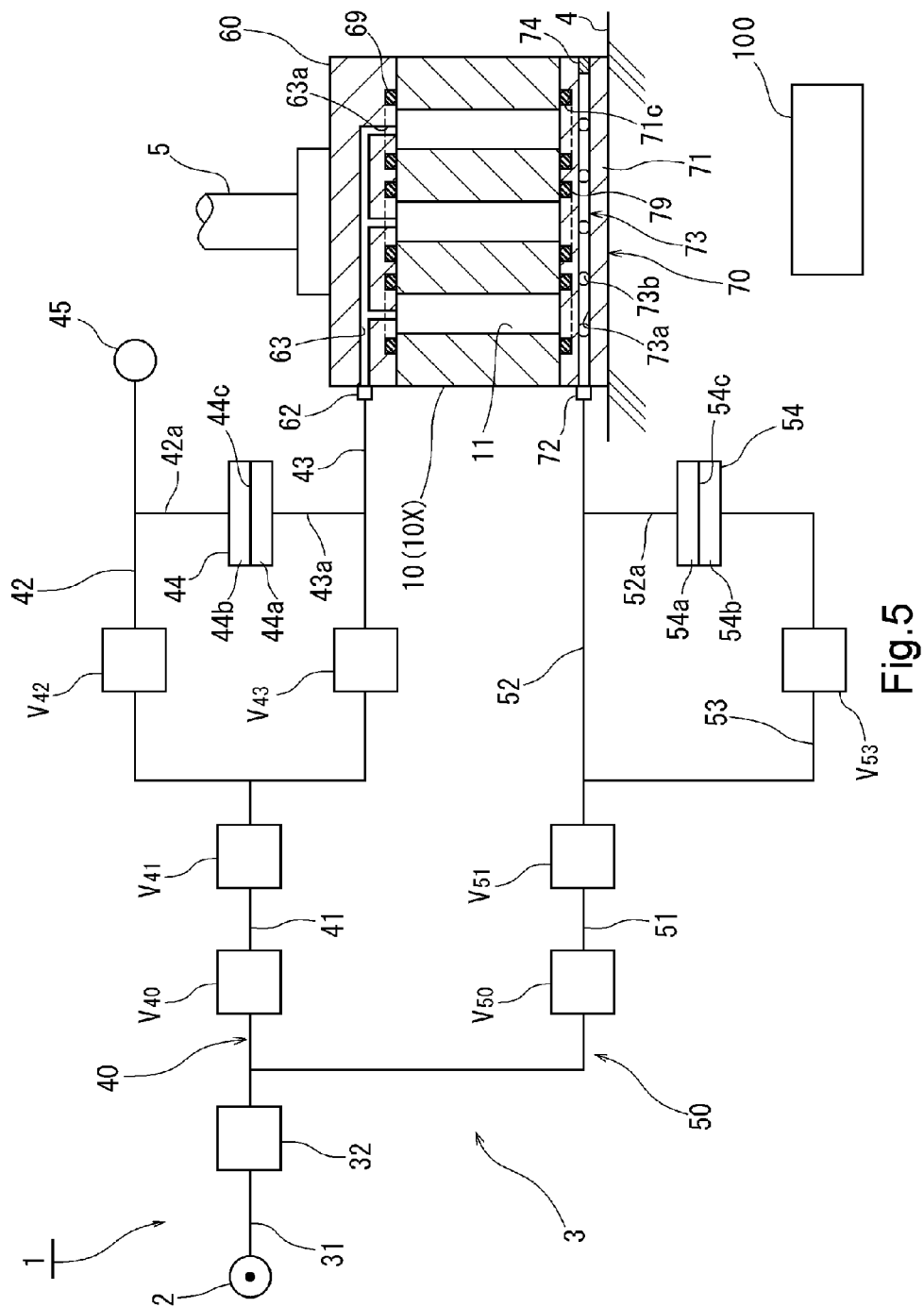
FIG. 5 is a circuit diagram of a leak testing apparatus according to a third embodiment of the present invention, showing a schematic structure of the apparatus.

In a third embodiment shown in FIG. 5, a pressure control valve $V_{40}$ is disposed in the first introduction passage 40. Air pressure in the first introduction passage 40 can be controlled by the pressure control valve $V_{40}$ and, consequently, introduction pressure to the inner spaces 11 can be controlled. A pressure control valve $V_{50}$ is disposed in the second introduction passage 50. Air pressure in the second introduction passage 50 can be controlled by the pressure control valve $V_{50}$ and, consequently, pressure inside the pressure chamber 73 can be controlled.

By the pressure control valves $V_{40}$, $V_{50}$, the inner pressure of the pressure chamber 73 and the inner pressure of the inner spaces 11 are controlled such that the inner pressure of the pressure chamber 73 is greater than the inner pressure of the inner spaces 11. For example, the inner pressure of the inner spaces 11 is controlled at 300 kPa and the inner pressure of the pressure chamber 73 is controlled at 500 kPa. In this arrangement, pressure in the pressure chamber 73 changes more greatly in response to the temperature change. In this way, measurement sensitivity of the heat sensitive member 70 with regard to the temperature change can be enhanced, thereby enabling slight temperature change to be surely detected.

A fourth embodiment of the present invention will now be described.

Figure 6:
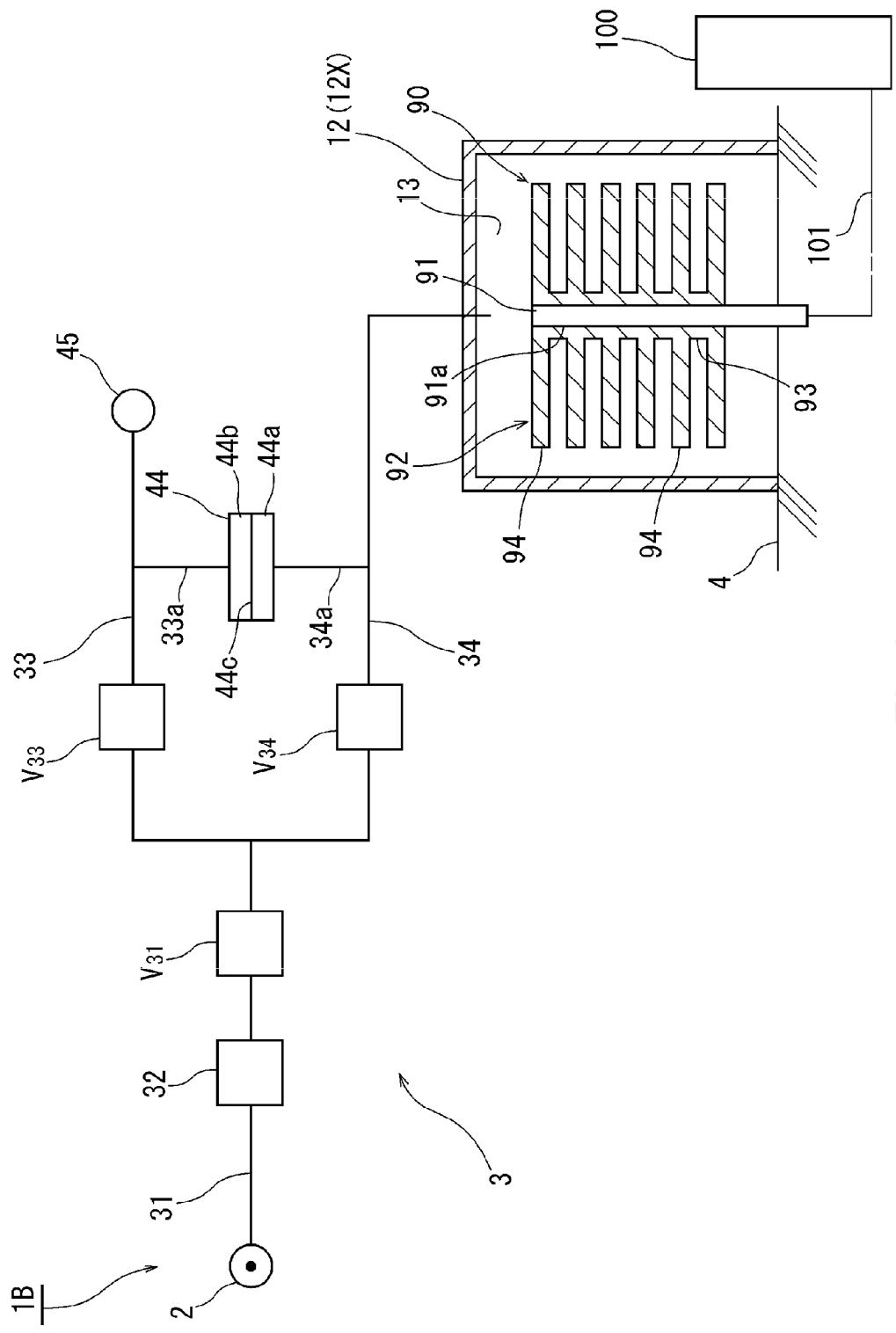
FIG. 6 is a circuit diagram of a leak testing apparatus according to a fourth embodiment of the present invention, showing a schematic structure of the apparatus.

As shown in FIG. 6, a leak testing apparatus 1B according to the fourth embodiment includes the pressurized gas source 2 as a source of pressurized gas, the pressurized gas passage 3 and the base 4. A workpiece 12 such as a cylinder block of an automotive engine is placed on the base 4. A space 13 is formed inside the workpiece 12. The inner space 13 is open to one surface of the workpiece 12. The opening of the inner space 13 is directed below and closed by the base 4. Although not shown in the drawing, a seal member such as an O-ring is provided in the base 4 to seal between the base 4 and a lower end surface of the workpiece 12. The workpiece 12 is pressed downward by a pressing actuator to be strongly pressed onto the base 4. By this, the inner space 13 is closed air-tightly.

The pressurized gas passage 3 of the leak testing apparatus 1B is constructed as follows:

The common passage 31 of the pressurized gas passage 3 extends from the pressurized gas source 2. The regulator 32 is provided in the common passage 31. The regulator 32 controls pressure in the portion of the common passage 31 located downstream of the regulator 32. An opening/closing valve $V_{31}$ is disposed in the portion of the common passage 31 located downstream of the regulator 32. A reference pressure passage 33 and an inspection pressure passage 34 are branched from the downstream end of the common passage 31.

An opening/closing valve $V_{33}$ is disposed in the reference pressure passage 33. The air tank 45 is connected to a downstream end of the reference pressure passage 33.

An opening/closing valve $V_{34}$ is disposed in the inspection pressure passage 34. A downstream end of the inspection pressure passage 34 is connected to the inner space 13 of the workpiece 12.

A sensor connection passage 33a is branched from the reference pressure passage 33 between the opening/closing valve $V_{33}$ and the air tank 45. A sensor connection passage 34a is branched from the inspection pressure passage 34 between the opening/closing valve $V_{34}$ and the workpiece 12. The differential pressure sensor 44 (pressure measuring device) is disposed between the two sensor connection passages 33a, 34a. The differential pressure sensor 44 includes the diaphragm 44c and the first chamber 44a and the second chamber 44b divided by the diaphragm 44c. The first chamber 44a is connected to the sensor connection passage 34a. The second chamber 44b is connected to the sensor connection passage 33a.

The leak testing apparatus 1B further includes a temperature measuring device 90. The temperature measuring device 90 has a measuring device body 91 and a heat collecting portion 92. The measuring device body 91 has a bar shape. A cylindrical housing 91a of the measuring device body 91 is made of metal such as aluminum or stainless steel. Although not shown in detail in the drawing, a temperature measuring circuit is received in the housing 91a. The temperature measuring circuit includes a resistor whose electrical resistance value (physical quantity correlating with temperature) changes according to the temperature. The resistor is made of platinum, etc.

The heat collecting portion 92 is disposed in an outer periphery of the measuring device body 91. The heat collecting portion 92 is made of aluminum, which is a high thermal conductivity material. The heat collecting portion 92 includes a shaft portion 93 and a plurality of fins 94. The shaft portion 93 has a cylindrical shape. The measuring device body 91 is inserted in the shaft portion 93. An inner peripheral surface of the shaft portion 93 contacts an outer peripheral surface of the housing 91a. Each of the fins 94 has a shape of a circular plate. The shaft portion 93, and therefore the measuring device body 91 are disposed in the middle portion of the fins 94. The plurality of fins 94 are located spaced from each other in a longitudinal direction of the measuring device body 91.

The temperature measuring device 90 is fixed on the base 4 and received in the inner space 13 of the workpiece 12. The temperature measuring device 90 occupies from one severalth to several tens percent of a volume of the inner space 13.

The leak testing apparatus 1B further includes the controller 100 for conducting a leak test in a method to be described later. The controller 100 includes the drive circuit, the input-output portion, the ROM, the RAM and the CPU. The drive circuit drives the opening/closing valves $V_{41}$, $V_{42}$, $V_{43}$, $V_{51}$, $V_{53}$. The input-output portion includes the signal conversion circuit. The control programs are stored in the ROM. The measured data obtained by the differential pressure sensors 44, 54, etc., are written in the RAM. The CPU conducts the control operations including the leak judgment (pass/fail judgment on the workpiece). A signal line 101 form the temperature measuring device 90 is connected to the controller 100.

A method for leak testing in the fourth embodiment will now be described. The leak testing in the fourth embodiment is also composed of a correlation obtaining operation and a regular inspection operation, conducted in this order.

[Correlation Obtaining Operation]

In the correlation obtaining operation, correlation between pressure change and temperature change in the inner space 13 of the workpiece 12 is determined. The workpiece 12 used in this part constitutes an "object for obtaining correlation". Hereinafter, "X" is added as appropriate to the reference numeral of the workpiece 12 as the object for obtaining correlation in order to distinguish such workpiece 12X from the workpiece 12 to be inspected in the regular inspection operation to be conducted later. The workpiece 12X is of the same type, the same shape, the same structure and the same material as the workpiece 12 to be inspected in the regular inspection operation. It may be known that the workpiece 12x does not leak. It may not be known whether the workpiece 12x leaks or does not leak. A pseudo workpiece having substantially the same structure as the workpiece 12 may be made and used as the workpiece 12X.

The workpiece 12X is placed on the base 4. The temperature measuring device 90 is received in the inner space 13 of the workpiece 12X. The opening of the inner space 13 is closed with the base 4 to seal the inner space 13.

The opening/closing valves $V_{31}$, $V_{33}$, $V_{34}$ are all opened. Compressed air (pressurized gas) in the order of some hundreds of kPa is introduced from the pressurized gas source 2 to the pressurized gas passage 3. A part of the compressed air is introduced into the air tank 45 via the reference pressure passage 33. The other part of the compressed air is introduced into the inner space 13 of the workpiece 12X (between an inner surface of the inner space 13 and an outer surface of the temperature measuring device 90 to be exact) via the inspection pressure passage 34.

Next, the opening/closing valve $V_{31}$ is closed. Then, the opening/closing valves $V_{33}$, $V_{34}$ are closed. As a result, the inner space 13 of the workpiece 12X and the air tank 45 are blocked from each other, each forming an independent closed system. The inner space 13 of the workpiece 12X communicates with the first chamber 44a of the differential pressure sensor 44. The air tank 45 communicates with the second chamber 44b of the differential pressure sensor 44. Therefore, differential pressure of the inner space 13 of the workpiece 12X (inner pressure information regarding the inner space 13) with pressure in the air tank 45 as reference can be measured by the differential pressure sensor 44.

At a time (time t=t0) when a predetermined balance period of about 2 to 3 seconds has passed following the closure of the opening/closing valves $V_{33}$, $V_{34}$, reading of the differential pressure sensor 44 is reset and differential pressure change after the resetting is measured and recorded.

The differential pressure change in the inner space 13 includes a component attributable to temperature change in the inner space 13 caused by temperature difference between the inner space 13 and the surroundings etc., a component attributable to temperature change in the inner space 13 caused by heat radiation after adiabatic compression, and a component attributable to air leak from the inner space 13, etc.

The temperature of the inner space 13 is measured by the temperature measuring device 90 concurrently with the above-mentioned differential pressure measurement.

After that, various conditions such as introduction pressure from the pressurized gas source 2, initial temperature of the workpiece 12X and ambient temperature are changed. Then data on the differential pressure change and data on the temperature change in the inner space 13 of the workpiece 12X are obtained in a similar manner as described above. Preferably, the same workpiece 12X is used throughout the changes made to the conditions.

For each of the conditions in which the data are obtained, a differential pressure versus time curve of the inner space 13 (inner pressure information regarding the inner space 13) and a temperature versus time curve of the inner space 13 (temperature information regarding the inner space 13) are compared to determine correlation between them.

Figure 7:
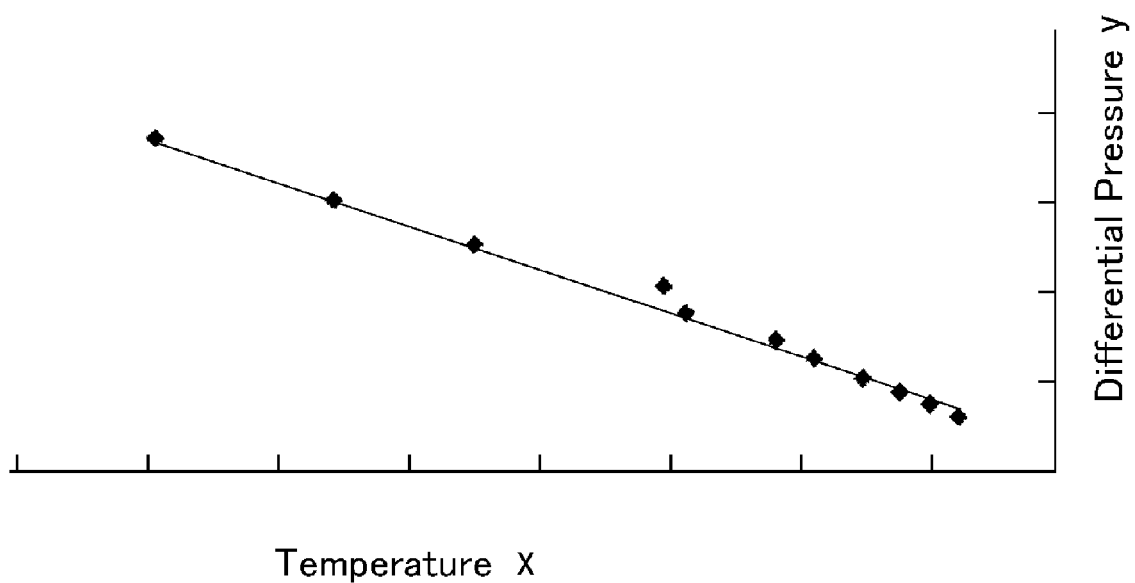
FIG. 7 is a graph showing correlation between temperature and differential pressure of an inner space of a workpiece at time t1.

For example, a differential pressure at a time when a certain time t1 has passed since the time t0 is picked up on the differential pressure versus time curve. Also, temperature at the same time t1 is picked up on the temperature versus time curve. It is preferable that the time t1 be set within a range in which the two time curves behave similarly. Setting of the time t1 can be changed arbitrarily. A graph is made in which a horizontal axis x represents the temperature of the inner space 13 at time t1 and a vertical axis y represents the differential pressure of the inner spaces 13 at time t1 as shown for example in FIG. 7. The pick-up data obtained in the above mentioned conditions are plotted on the graph. For the plotted pick-up data, linear interpolation is performed by the least-square method. This yields the linear expression (1) showing correlation between the temperature x of the inner space 13 and the differential pressure y of the inner space 13:

$$y=ax+b \quad (1)$$

where both a and b are constants.

Instead of the temperature and the differential pressure at time t1, a gradient of a line connecting the temperature at time t0 and the temperature at time t1 and a gradient of a line connecting the differential pressure at time t0 and the differential pressure at time t1 may be used as pick-up data. In this case, a correlation equation equivalent to the expression (1) is obtained. Alternatively, differential values of the temperature and the differential pressure at time t0 may be used as pick-up data to obtain a correlation equation. Alternatively, as shown in Japanese Published Patent Application No. 2004-61201, an approximate expression involving an exponential function may be formulated and non-linear fitting may be performed to determine a coefficient of the approximate expression.

Of the first term and the second term in the right-hand side of the correlation equation (1), only the first term includes the temperature x of the inner space 13. The constant b in the second term is a quantity not related to the temperature change in the inner space 13. In other words, the constant b corresponds to the amount of differential pressure change in the inner space 13 with the amount attributable to the temperature change subtracted therefrom. This means that the constant b indicates the component of the differential pressure change caused by the leak form the inner space 13. Therefore, correlation between the temperature change and the differential pressure change attributable only to the temperature change in the inner space 13 can be expressed in the expression (2) shown below:

$$y=ax \quad (2)$$

After the correlation is determined, the workpiece 12X is removed from the leak testing apparatus 1B.

[Regular Inspection Operation]

After that, the testing proceeds to the regular inspection operation.

Prior to the inspection, a workpiece 12 to be actually inspected is washed with warm wash water of around 40° C., for example. By this, the workpiece 12 is warmed to around 40° C., for example.

Placing Step

The workpiece 12 is placed on the base 4. The temperature measuring device 90 is received in the inner space 13 of the workpiece 12. The opening of the inner space 13 is closed with the base 4 to seal the inner space 13.

The temperature of the workpiece 12 gradually decreases due to heat radiation.

First Detecting Step and Second Detecting Step

Then detecting steps generally the same as those in the above-mentioned correlation obtaining operation are performed.

Specifically, compressed air is introduced to the inner space 13 of the workpiece 12 and the air tank 45.

Next, the opening/closing valve $V_{31}$ is closed. Then, the opening/closing valves $V_{33}$, $V_{34}$ are closed. As a result, the inner space 13 of the workpiece 12 and the air tank 45 are blocked from each other, each forming an independent closed system. The inner space 13 of the workpiece 12X communicates with the first chamber 44a of the differential pressure sensor 44. The air tank 45 communicates with the second chamber 44b of the differential pressure sensor 44. Therefore, differential pressure of the inner space 13 of the workpiece 12 (inner pressure information regarding the inner space 13) with pressure in the air tank 45 as reference can be measured by the differential pressure sensor 44.

At a time t0 when a predetermined balance period (about 2 to 3 seconds) has passed following the closure of the opening/closing valves $V_{33}$, $V_{34}$, reading of the differential pressure sensor 44 is reset and differential pressure change thereafter is measured and recorded. At the same time, the temperature of the inner space 13 of the workpiece 12 is measured by the temperature measuring device 90. A measured differential pressure $D_{13}$ of the inner space 13 obtained by the differential pressure sensor 44 (inner pressure information) at a time when a certain time t1 has passed since the time t0 and a measured temperature $T_{90}$ of the inner space 13 obtained by the temperature measuring device 90 (temperature information) at the time t1 are picked up.

Compensating Step

After that, the measured differential pressure $D_{13}$ of the inner space 13 is compensated based on the measured temperature $T_{90}$ and the correlation equation (2) obtained in the determination of compensation part mentioned above. Specifically, the measured temperature $T_{90}$ is substituted for the variable x in the right-hand side of the equation (2) to obtain an amount of differential pressure change attributable to temperature of the inner space 13 $y=aT_{90}$. The amount of differential pressure change $aT_{90}$ is subtracted from the actually measured differential pressure $D_{13}$. In other words, the following operation is performed:

$$D_{LEAK}=D_{13}-aT_{90} \quad (3)$$

By this operation, amount of differential pressure change attributable only to the leak from the inner space 13 $D_{LEAK}$ is obtained.

The compensation mentioned above is made by the controller 100. The controller 100 at this time constitutes a compensator.

Judging Step

Pass/fail judgment is made on the workpiece 12 based on the amount of differential pressure change $D_{LEAK}$. Specifically, if the amount of differential pressure change $D_{LEAK}$ does not exceed an allowable maximum, the workpiece 12 is judged to be good. If the amount of differential pressure change $D_{LEAK}$ exceeds the allowable maximum, the workpiece 12 is judged to be defective.

The judgment mentioned above is performed by the controller 100. The controller 100 at this time constitutes a judgment means.

According to the method for judgment in the fourth embodiment, accuracy of judgment can be increased since the amount of differential pressure change attributable to the temperature change is excluded. Since the temperature measuring device 90 is disposed in the inner space 13, volume of space in which the compressed air is to be filled is reduced by the volume of the temperature measuring device 90. This serves to enhance sensitivity to the leak.

Heat in the inner space 13 can be surely caught by the fins 94 and transmitted to the measuring device body 91. Therefore, the temperature of the inner space 13 can be surely measured. Since the fins 94 surround an entire periphery of the measuring device body 91 and, moreover, the plurality of fins 94 are widely distributed inside the inner space 13, heat can be caught equally from almost throughout the inner space 13. Therefore, the temperature of an entirety of the inner space 13 can be measured evenly. As a result, even when there is a temperature distribution in the inner space 13, reliability can be secured.

The temperature measuring device 90 directly detects electric current or voltage and indirectly detects electrical resistance as physical quantities correlating with the temperature. The temperature measuring device 90 does not adopt pressure as physical quantity correlating with the temperature. Therefore, it is not necessary to provide a pressure chamber in the temperature measuring device. Therefore, the temperature measuring device can be made compact. Even if the inner space 13 of the workpiece 12 is narrow or has an irregular shape, the temperature measuring device can be easily disposed in the inner space 13.

In the fourth embodiment, the second introduction passage 50 and the second pressure sensor 54 in the first embodiment can be omitted.

The resistance thermometer 90 can acquire temperature almost unambiguously form the detected values of electric current or electric resistance. As the measuring device body 91, a commercially available thermometer can be used as far as correlation between detected values of electric current or electric resistance, i.e. detected physical quantity and the temperature is known. Therefore, steps for determining correlation between the detected physical quantity and the temperature can be omitted.

The present invention is not limited to the embodiments described above and various modifications can be made.

For example, the workpiece 10, 12 is not limited to the cylinder block. In addition to the cylinder block, the present invention can be applied to various kinds of workpieces having an inner space such as a radiator, an evaporator, a sealed vessel, etc.

The first pressure sensor does not have to be a differential sensor, but may be a pressure sensor which measures the pressures in the inner spaces 11, 13 themselves.

The second pressure sensor does not have to be a differential sensor, but may be a pressure sensor which measures the pressure in the pressure chamber 73 itself.

In the first to the third embodiments, the port 72 may be disposed at one end portion of each of the hole portions 73a. The branch passage 52 may be branched into a plurality of port connecting passages corresponding to the plurality of the hole portions 73a. Each of the port connecting passages is connected to the port 72 of the corresponding one of the plurality of hole portions 73a.

Some hole portions 73a and other hole portions 73a constituting the pressure chamber 73 do not have to intersect at right angle. They may intersect obliquely.

The hole portions 73a may be curved.

The heat sensitive member 70 may have a box shape, and an inner space of the heat sensitive member 70 having the box shape may serve as the pressure chamber 73. If the heat sensitive member 70 is made in the box shape, it is preferable that a reinforcement portion such as ribs is provided thereto so that the heat sensitive member 70 can sufficiently withstand the pressing force of the pressing means 5.

When the inner spaces 11 of the workpiece 10 is open to a side surface in the left or right of the workpiece 10 as well, an additional heat sensitive member 70 may be disposed such that the additional heat sensitive member 70 is abutted against the side surface in the left or right to close the opening of the side surface.

The heat sensitive member 70 may be disposed in the upper side of the workpiece 10, and the pressure introduction passage forming member 60 may be disposed in the lower side of the workpiece 10. The workpiece 10 may be placed turned 90 degrees from the way shown in FIG. 1, and the pressure introduction passage forming member 60 and the heat sensitive member 70 may be placed on the left and right of the workpiece 10.

Instead of introducing the pressurized gas form the pressure introduction passage forming member 60 into the inner spaces 11, the pressurized gas may be introduced from the heat sensitive member 70 into the inner spaces 11.

The pressurized gas supplied by the source 2 is not limited to air, but may be nitrogen or helium, etc.

The temperature measuring device 80 is not limited to the resistance thermometer, but may be a thermocouple thermometer, a liquid column thermometer, a bimetal thermometer, an infrared radiation thermometer or other kinds of thermometer.

The temperature measuring device 80 may have only one temperature sensing portion 81. The temperature measuring device 80 may have three or more temperature sensing portions 81.

The initial temperature of the workpiece 10 is not limited to around 40° C. The workpiece 10 may have a higher or lower temperature when set in the leak testing apparatus 1. The workpiece 10 does not have to be in a warmed condition, but may be in room temperature or in a cooled condition when set in the leak testing apparatus 1.

Instead of the controller 100 including the CPU, analog circuits may be used for constituting the compensator and the judgment means.

In the fourth embodiment, the temperature measuring device 90 is not limited to the resistance thermometer as long as it is not of a pressure type. The temperature measuring device 90 may be a bimetal thermometer, a liquid column thermometer, a thermocouple thermometer, a radiation thermometer or other kinds of thermometer.

The temperature measuring device 90 may have a plurality of temperature sensing portions such as resistors, with the temperature sensing portions spaced from each other.

The heat collecting portion 92 does not have to be integrally formed, but each of the fins 94 may be separable. The fins 94 may be omitted from the temperature measuring device 90. The heat collecting portion 92 may be omitted from the temperature measuring device 90. The temperature measuring device 90 may be composed only of the measuring device body 91.

The temperature measuring device 90 does not have to be received in the inner space 13. The temperature measuring device 90 may be disposed outside of the inner space 13, or may be disposed on an outer surface of the workpiece 12.

The invention claimed is:

1. A leak testing apparatus for testing a workpiece having an inner space including an opening open to an outer surface, the leak testing apparatus comprising:
 a heat sensitive member including a body made of a material having high thermal conductivity, the body having an outer side surface abutted against the outer surface of the workpiece to close the opening, a pressure chamber formed inside the body, the pressure chamber arranged along the outer side surface and arranged over an area wider than the opening;
 a first introduction passage that introduces pressurized gas to the inner space;
 a first pressure sensor that detects an inner pressure of the inner space (hereinafter referred to as a first inner pressure information);
 a second introduction passage that introduces the pressurized gas to the pressure chamber;
 a second pressure sensor that detects an inner pressure of the pressure chamber (hereinafter referred to as a second inner pressure information);
 a compensator that compensates the first inner pressure information based on the second inner pressure information by subtracting a component attributable to temperature change in the inner space from the first inner pressure information; and
 a judger that judges whether or not there is a leak from the inner space based on the compensated first inner pressure information.

2. The leak testing apparatus according to claim 1 wherein the pressure chamber is formed along the outer surface of the workpiece over an area wider than the opening.

3. The leak testing apparatus according to claim 1 wherein a seal member is provided around a portion of the body closing the opening.

4. A method for leak testing a workpiece having an inner space including an opening open to an outer surface, the method comprising:
 a placing step of placing a heat sensitive member having high thermal conductivity outside of the inner space such that the heat sensitive member is abutted against the outer surface to close the opening of the inner space to the outer surface;
 a first detecting step of detecting an inner pressure of the inner space (hereinafter referred to as a first inner pressure information) after introducing pressurized gas to the inner space;
 a second detecting step of detecting an inner pressure of the pressure chamber (hereinafter referred to as a second inner pressure information) after introducing the pressurized gas to a pressure chamber formed inside the heat sensitive member as arranged along the outer surface and as arranged over an area wider than the opening;
 a compensating step of compensating the first inner pressure information based on the second inner pressure information by subtracting a component attributable to temperature change in the inner space from the first inner pressure information; and
 a judging step of judging whether or not there is a leak from the inner space based on the compensated first inner pressure information.

5. The method for leak testing according to claim 4 wherein an introduction pressure of the pressurized gas to the pressure chamber is higher than an introduction pressure of the pressurized gas to the inner space.

6. The method for leak testing according to claim 4 wherein temperature of a portion of the outer surface of the workpiece other than a portion to be abutted against the heat sensitive member or temperature of the heat sensitive member is measured by a second temperature measuring device, and when temperature information obtained by the second temperature measuring device is more highly correlated to the first inner pressure information than to the second inner pressure information, the compensation is made based on the temperature information instead of the second inner pressure information.

7. A heat sensitive member adopted for the method for leak testing according to claim 4, wherein the pressure chamber includes a plurality of first hole portions disposed parallel to one another and a second hole portion intersecting the plurality of first hole portions.

8. A leak testing apparatus for testing a workpiece having an inner space, the leak testing apparatus comprising:
 a temperature measuring device disposed in the inner space, the temperature measuring device measuring physical quantities responsive to temperature of the inner space, the physical quantities not including pressure;
 an introduction passage that introduces pressurized gas to an inspection space between an inner peripheral surface of the inner space of the workpiece and the temperature measuring device;
 a pressure sensor that detects an inner pressure information regarding the inspection space;
 a compensator that compensates the inner pressure information based on measurement information on the physical quantities by subtracting a component attributable to temperature change in the inspection space from the inner pressure information; and
 a judger that judges whether or not there is a leak from the inspection space based on the compensated inner pressure information.

9. The leak testing apparatus according to claim 8 wherein a fin is disposed in an outer periphery of the temperature measuring device.

10. A temperature measuring device for the leak testing apparatus according to claim 8, further comprising a temperature measuring circuit having a resistance whose electrical resistance value varies according to the temperature.

* * * * *